United States Patent
Chen

(10) Patent No.: US 10,365,984 B2
(45) Date of Patent: Jul. 30, 2019

(54) GRAPHICS CARD WARNING CIRCUIT

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventor: Chun-Sheng Chen, New Taipei (TW)

(73) Assignees: HONGFUJIN PRECISION INDUSTRY (WUHAN) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 176 days.

(21) Appl. No.: 15/666,056

(22) Filed: Aug. 1, 2017

(65) Prior Publication Data
US 2018/0260293 A1 Sep. 13, 2018

(30) Foreign Application Priority Data

Mar. 10, 2017 (CN) .......................... 2017 1 0141179

(51) Int. Cl.
| G06F 11/00 | (2006.01) |
| G06F 11/24 | (2006.01) |
| G09G 5/36 | (2006.01) |
| G09G 5/00 | (2006.01) |
| G01R 31/02 | (2006.01) |
| G06F 3/14 | (2006.01) |

(52) U.S. Cl.
CPC .............. *G06F 11/24* (2013.01); *G01R 31/02* (2013.01); *G06F 3/14* (2013.01); *G09G 5/003* (2013.01); *G09G 5/006* (2013.01); *G09G 5/363* (2013.01); *G09G 2370/12* (2013.01)

(58) Field of Classification Search
CPC ........... G06F 3/14; G06F 11/24; G09G 5/003; G09G 5/006; G09G 5/363; G01R 31/02
See application file for complete search history.

(56) References Cited

U.S. PATENT DOCUMENTS

| 7,698,579 B2* | 4/2010 | Hendry | G06F 1/3218 |
| | | | 345/502 |
| 8,325,193 B1* | 12/2012 | Wyatt | G06T 15/005 |
| | | | 345/502 |
| 8,373,707 B1* | 2/2013 | Wyatt | G06F 9/4411 |
| | | | 345/501 |
| 8,810,586 B2* | 8/2014 | Sudo | G06F 3/14 |
| | | | 345/502 |

(Continued)

*Primary Examiner* — Joshua P Lottich
(74) *Attorney, Agent, or Firm* — ScienBiziP, P.C.

(57) ABSTRACT

A warning circuit is configured to output a warning in response to an integrated graphics card unit being coupled to a display screen and a discrete graphics card being coupled to a first connector. The first connector is configured to output a coupling signal in response to the discrete graphics card being coupled to the first connector. The integrated graphics card unit is configured to output a control signal in response to the integrated graphics card unit being coupled to the display screen. The warning circuit includes a controller that controls the discrete graphics card to convert display data to drive the display screen in response to receiving the coupling signal. The warning circuit is configured to output the warning in response to receiving the control signal and the coupling signal.

18 Claims, 3 Drawing Sheets

(56) References Cited

U.S. PATENT DOCUMENTS

| | | | |
|---|---|---|---|
| 8,941,669 B1* | 1/2015 | Moreton | G06F 9/505 |
| | | | 345/502 |
| 9,064,322 B1* | 6/2015 | Wyatt | G06T 1/20 |
| 10,224,003 B1* | 3/2019 | Akiyama | G09G 5/006 |
| 2008/0030509 A1* | 2/2008 | Conroy | G09G 5/12 |
| | | | 345/502 |
| 2010/0091025 A1* | 4/2010 | Nugent | G09G 5/363 |
| | | | 345/502 |
| 2010/0220102 A1* | 9/2010 | Wyatt | G06F 3/1438 |
| | | | 345/502 |
| 2010/0332799 A1* | 12/2010 | Sonobe | G06F 1/206 |
| | | | 712/43 |
| 2011/0267359 A1* | 11/2011 | Redman | G06F 3/1438 |
| | | | 345/502 |
| 2013/0076777 A1* | 3/2013 | Park | G06F 3/14 |
| | | | 345/594 |
| 2017/0161212 A1* | 6/2017 | Campbell | G06F 1/1632 |

* cited by examiner

GRAPHICS CARD WARNING CIRCUIT

FIELD

The subject matter herein generally relates to graphics card warning circuit.

BACKGROUND

A current main board includes an integrated graphics card to connect to and drive a display screen. The main board can support a discrete graphics card to improve a display performance. When the discrete graphics is plugged into the main board and the integrated graphics card is connected to the display screen, the display screen may not display properly, and an inaccurate diagnosis of the main board or the display screen may be given.

BRIEF DESCRIPTION OF THE DRAWINGS

Implementations of the present technology will now be described, by way of example only, with reference to the attached figures.

DETAILED DESCRIPTION

Figure 1:
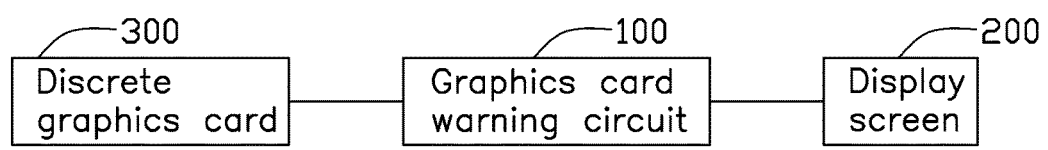
FIG. 1 is a diagram of an exemplary embodiment of a graphics card warning circuit.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates a graphics card warning circuit 100 in accordance with an exemplary embodiment.

Figure 2:
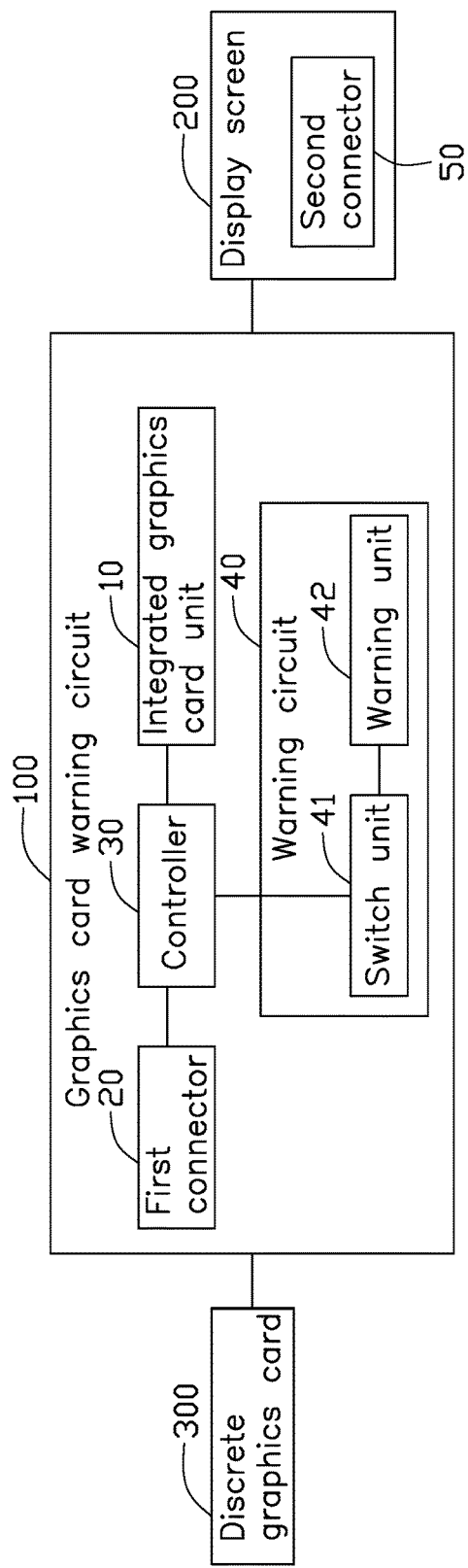
FIG. 2 is a block diagram of an exemplary embodiment of the graphics card warning circuit of FIG. 1.

The graphics card warning circuit 100 is coupled between a display screen 200 and a discrete graphics card 300. The graphics card warning circuit 100 comprises an integrated graphics card unit 10 (as shown in FIG. 2). The display screen 200 can be driven by the discrete graphics card 300 or the integrated graphics card unit 10.

In one exemplary embodiment, the graphics card warning circuit 100 can be set on a computer main board or a video monitor main board, for example. The integrated graphics card unit 10 and the discrete graphics card 300 can convert information outputted by the computer main board or the video monitor main board to drive the display screen 200.

Referring to FIG. 2, the graphics card warning circuit 100 comprises the integrated graphics card unit 10, a first connector 20, a controller 30, and a warning circuit 40. The integrated graphics card unit 10 is configured to output a control signal in response to the integrated graphics card unit 10 being coupled to the display screen 200. The first connector 20 is configured to output a coupling signal in response to the discrete graphics card 300 being coupled to the first connector 20. The controller 30 is coupled to the first connector 20 and the integrated graphics card unit 10.

When the discrete graphics card 300 is coupled to the first connector 20, the controller 30 preferentially selects the discrete graphics card 300 to drive the display screen 200. When the controller 30 receives the control signal and does not receive the coupling signal, the controller 30 controls the integrated graphics card unit 10 to convert the information to drive the display screen 200. When the controller 30 receives the coupling signal (or both the coupling signal and the control signal), the controller 30 controls the discrete graphics card 300 to convert the information to drive the display screen 200.

The warning circuit 40 is coupled to the controller 30. The warning circuit 40 is configured to output warning in response to receiving the control signal and the coupling signal. As such, the warning circuit 40 can indicate a state of connection.

In one exemplary embodiment, the display screen 200 comprises a second connector 50. When the discrete graphics card 300 is not coupled to the first connector 20 and the integrated graphics card unit 10 is coupled to the second connector 50, the integrated graphics card unit 10 can receive and convert the information to drive the display screen 200 to display images. When the discrete graphics card 300 is coupled to the first connector 20 and the integrated graphics card unit 10 is coupled to the second connector 50, the controller 30 controls the discrete graphics card 300 to receive and convert the information. Because the discrete graphics card 300 is not coupled to the second connector 50 and the integrated graphics card unit 10 does not receive the information for display, the display screen 200 cannot be driven to display images. When the discrete graphics card 300 is coupled to the first connector 20 and the second connector 50, the discrete graphics card 300 drives the display screen 200 to display images.

Figure 3:
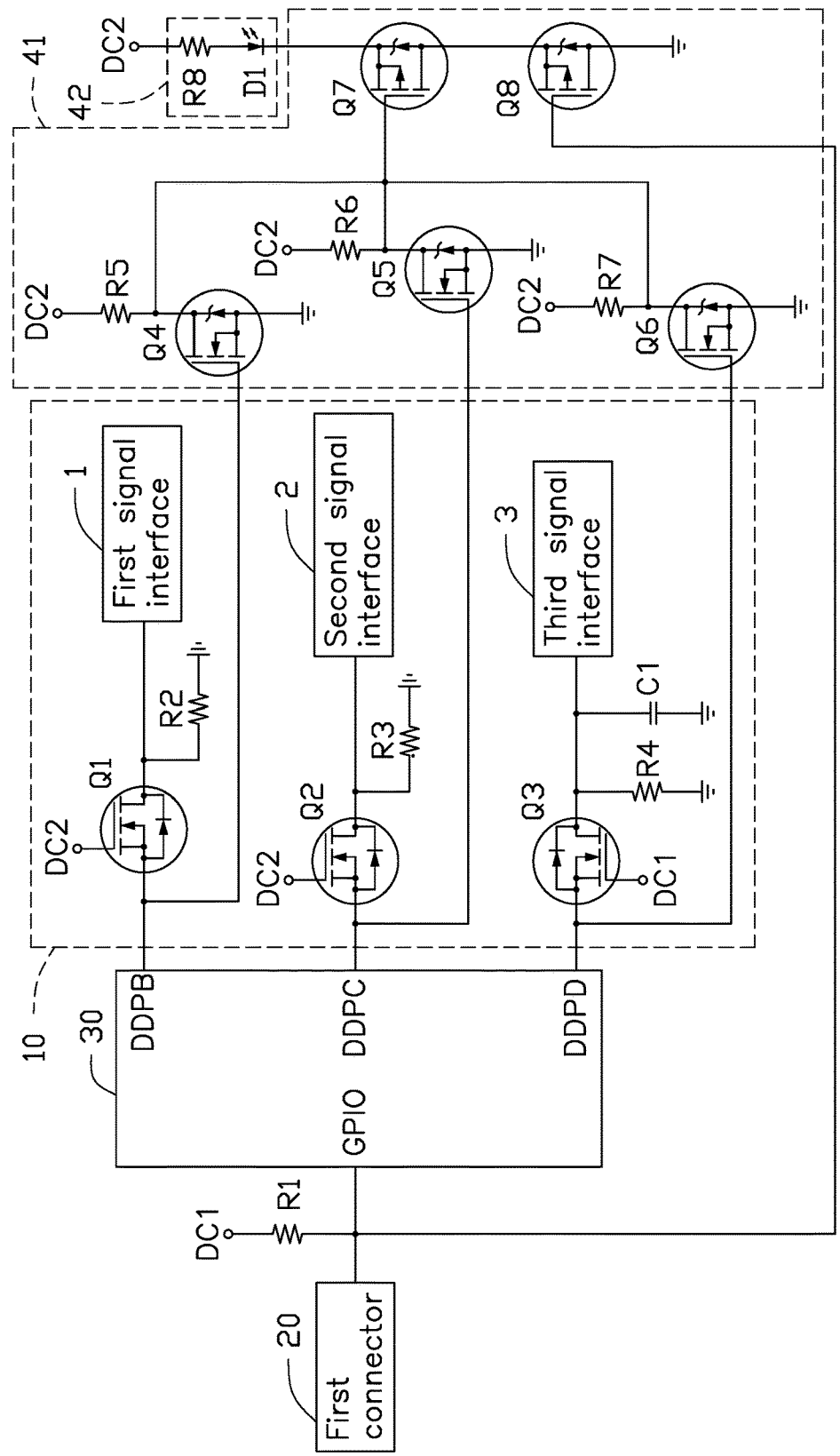
FIG. 3 is a circuit diagram of an exemplary embodiment of the graphics card warning circuit of FIG. 1.

In one exemplary embodiment, with reference to FIG. 3, the integrated graphics card unit 10 comprises a first signal interface 1 that supports display port (DP) standard, a second signal interface 2 that supports embedded display port (eDP) standard, and a third signal interface 3 that supports high definition multimedia interface (HDMI) standard.

In one exemplary embodiment, the first connector 20 can be a peripheral component interface express X16 (PCI-E X16) slot, and the discrete graphics card 300 can plug into the PCI-E X16 slot. The control signal can be a high level signal and the coupling signal can be a low level signal.

Referring to FIG. 3, the controller 30 can be a platform controller hub (PCH) chip. The controller 30 comprises a first signal pin GPIO, a second signal pin DDPB, a third signal pin DDPC, and a fourth signal pin DDPD. The first signal pin GPIO is coupled to the first connector 20. A first terminal of a first resistor R1 is coupled to a node between the first signal pin GPIO and the first connector 20, and a second terminal of the first resistor R1 is coupled to a first power source DC1. When the discrete graphics card 300 plugs into the first connector 20, a signal level of the first signal pin GPIO is changed from a high level to a low level.

The integrated graphics card unit 10 comprises a first transistor Q1, a second transistor Q2, a third transistor Q3, a second resistor R2, a third resistor R3, a fourth resistor R4, a first capacitor C1, the first signal interface 1, the second signal interface 2, and the third signal interface 3. A control terminal of the first transistor Q1 is coupled to a second power source DC2, a first terminal of the first transistor Q1 is coupled to the first signal interface 1, and a second terminal of the first transistor Q1 is coupled to the second signal pin DDPB. A first terminal of the second resistor R2 is coupled to the first terminal of the first transistor Q1, and a second terminal of the second resistor R2 is grounded. A control terminal of the second transistor Q2 is coupled to the second power source DC2, a first terminal of the second transistor Q2 is coupled to the second signal interface 2, and a second terminal of the second transistor Q2 is coupled to the third signal pin DDPC. A first terminal of the third resistor R3 is coupled to the first terminal of the second transistor Q2, and a second terminal of the third resistor R3 is grounded. A control terminal of the third transistor Q3 is coupled to the first power source DC1, a first terminal of the third transistor Q3 is coupled to the third signal interface 3, and a second terminal of the third transistor Q3 is coupled to the fourth signal pin DDPD. A first terminal of the fourth resistor R4 is coupled to the first terminal of the third transistor Q3, and a second terminal of the fourth resistor R4 is grounded. The first capacitor C1 is coupled to the fourth resistor R4 in parallel.

When the first signal interface 1 is coupled to the second connector 50 of the display screen 200, the first transistor Q1 is changed from an off state to an on state. Then, a signal level of the second signal pin DDPB is changed from a low level to a high level. When the second signal interface 2 is coupled to the second connector 50 of the display screen 200, the second transistor Q2 is changed from an off state to an on state. Then, a signal level of the third signal pin DDPC is changed from a low level to a high level. When the third signal interface 3 is coupled to the second connector 50 of the display screen 200, the third transistor Q3 is changed from an off state to an on state. Then, a signal level of the fourth signal pin DDPD is changed from a low level to a high level.

In one exemplary embodiment, the low level can be a voltage that is less than a first predetermined voltage. The high level can be a voltage that is greater than a second predetermined voltage. The first predetermined voltage can be 0.7V and the second predetermined voltage can be 1.5V, for example.

In one exemplary embodiment, a voltage of the first power source DC1 can be 3.3V. A voltage of the second power source DC2 can be 5V.

The warning circuit 40 comprises a switch unit 41 and a warning unit 42, as shown in FIG. 2. The switch unit 41 comprises fourth to eighth transistors (i.e., Q4, Q5, Q6, Q7, and Q8), and fifth to seventh resistors (i.e., R5, R6, and R7). The warning unit 42 comprises an eighth resistor (i.e., R8) and a light emitting diode (LED) D1.

A control terminal of the fourth transistor Q4 is coupled to the second signal pin DDPB, a first terminal of the fourth transistor Q4 is coupled to a first terminal of the fifth resistor R5, and a second terminal of the fourth transistor Q4 is grounded. A second terminal of the fifth resistor R5 is coupled to the second power source DC2. A control terminal of the fifth transistor Q5 is coupled to the third signal pin DDPC, a first terminal of the fifth transistor Q5 is coupled to a first terminal of the sixth resistor R6, and a second terminal of the fifth transistor Q5 is grounded. A second terminal of the sixth resistor R6 is coupled to the second power source DC2. A control terminal of the sixth transistor Q6 is coupled to the fourth signal pin DDPD, a first terminal of the sixth transistor Q6 is coupled to a first terminal of the seventh resistor R7, and a second terminal of the sixth transistor Q6 is grounded. A second terminal of the seventh resistor R7 is coupled to the second power source DC2. A control terminal of the seventh transistor Q7 is coupled to the first terminal of the fourth transistor Q4, the first terminal of the fifth transistor Q5, and the first terminal of the sixth transistor Q6, and a second terminal of the seventh transistor Q7 is coupled to a cathode of the LED D1. An anode of the LED D1 is coupled to a first terminal of the eighth resistor R8, and a second terminal of the eighth resistor R8 is coupled to the second power source DC2. A control terminal of the eighth transistor Q8 is coupled to the first signal pin GPIO, a first terminal of the eighth transistor Q8 is grounded, and a second terminal of the eighth transistor Q8 is coupled to a first terminal of the seventh transistor Q7.

When the discrete graphics card 300 is coupled to the first connector 20 and the first signal interface 1 is coupled to the second connector 50, the signal level of the first signal pin GPIO is the low level and the signal level of the second signal pin DDPB is the high level. Then, the fourth transistor Q4, the seventh transistor Q7, and the eighth transistor Q8 switch on, and the LED D1 is lit to output the warning.

When the discrete graphics card 300 is coupled to the first connector 20 and the second signal interface 2 is coupled to the second connector 50, the signal level of the first signal pin GPIO is the low level and the signal level of the third signal pin DDPC is the high level. Then, the fifth transistor Q5, the seventh transistor Q7, and the eighth transistor Q8 switch on, and the LED D1 is lit to output the warning.

When the discrete graphics card 300 is coupled to the first connector 20 and the third signal interface 3 is coupled to the second connector 50, the signal level of the first signal pin GPIO is the low level and the signal level of the fourth signal pin DDPD is the high level. Then, the sixth transistor Q6, the seventh transistor Q7, and the eighth transistor Q8 switch on, and the LED D1 is lit to output the warning.

In one exemplary embodiment, the first to sixth transistors, Q1 to Q6, can be N-type metal oxide semiconductor field effect transistors (NMOSFETs), and the seventh transistor Q7 and the eighth transistor Q8 can be P-type metal oxide semiconductor field effect transistors (PMOSFETs).

The exemplary embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A graphics card warning circuit comprising:
a first connector configured to output a coupling signal in response to a discrete graphics card being coupled to the first connector;
an integrated graphics card unit configured to output a control signal in response to the integrated graphics card unit being coupled to a display screen;
a controller coupled to the first connector and the integrated graphics card unit; and
a warning circuit coupled to the controller;
wherein the controller is configured to control the integrated graphics card unit to convert information to drive the display screen in response to receiving the control signal and not receiving the coupling signal, the controller is further configured to control the discrete graphics card to convert the information to drive the display screen in response to receiving the coupling signal, and the warning circuit is configured to output warning in response to receiving the control signal and the coupling signal.

2. The graphics card warning circuit of claim 1, wherein:
the display screen comprises a second connector;
when the integrated graphics card unit is coupled to the second connector and the controller does not receive the coupling signal, the integrated graphics card unit drives the display screen to display; and
when the integrated graphics card unit is coupled to the second connector and the controller receives the coupling signal, the integrated graphics card unit cannot drive the display screen to display.

3. The graphics card warning circuit of claim 2, wherein when the controller receives the coupling signal and the discrete graphics card is coupled to the second connector, the discrete graphics card drives the display screen to display.

4. The graphics card warning circuit of claim 1, wherein:
the warning circuit comprises a switch unit and a warning unit, the switch unit is configured to switch on in response to receiving the control signal and the coupling signal; and
the warning unit is configured to output the warning after the switch unit switches on.

5. The graphics card warning circuit of claim 4, wherein:
the switch unit comprises a first transistor, a first resistor, a second transistor, and a third transistor;
a control terminal of the first transistor is coupled to the controller and configured to receive the control signal, and a second terminal of the first transistor is grounded;
a first terminal of the first resistor is coupled to a first power source, and a second terminal of the first resistor is coupled to a first terminal of the first transistor;
a control terminal of the second transistor is coupled to the first terminal of the first resistor, a second terminal of the second transistor is coupled to the first power source; and
a control terminal of the third transistor is coupled to the controller and configured to receive the coupling signal, a first terminal of the third transistor is grounded, and a second terminal of the third transistor is coupled to the first terminal of the second transistor.

6. The graphics card warning circuit of claim 5, wherein:
the warning unit comprises a second resistor and a light emitting diode (LED);
a first terminal of the second resistor is coupled to the first power source; and
an anode of the LED is coupled to a second terminal of the second resistor, and a cathode of the LED is coupled to the second terminal of the second transistor.

7. The graphics card warning circuit of claim 5, wherein the first transistor is an N-type metal oxide semiconductor field effect transistor (NMOSFET), and the second transistor and the third transistor are P-type metal oxide semiconductor field effect transistors (PMOSFETs).

8. The graphics card warning circuit of claim 1, wherein:
the controller comprises a first signal pin and a second signal pin; the second signal pin is configured to output the control signal; and
the first signal pin is coupled to a first terminal of a third resistor and the first connector, a second terminal of the third resistor is coupled to a second power source; and when the discrete graphics card is coupled to the first connector, a signal level of the first signal pin is changed from a high level to a low level.

9. The graphics card warning circuit of claim 8, wherein the control signal is a high level signal and the coupling signal is a low level signal.

10. A graphics card warning circuit comprising:
a discrete graphics card;
a first connector configured to output a coupling signal in response to the discrete graphics card being coupled to the first connector;
an integrated graphics card unit configured to output a control signal in response to the integrated graphics card unit being coupled to a display screen;
a controller coupled to the first connector and the integrated graphics card unit; and
a warning circuit coupled to the controller;
wherein the controller is configured to control the discrete graphics card to convert information to drive the display screen in response to receiving the coupling signal; and the warning circuit is configured to output warning in response to receiving the control signal and the coupling signal.

11. The graphics card warning circuit of claim 10, wherein:
the display screen comprises a second connector; and
when the integrated graphics card unit is coupled to the second connector and the discrete graphics card is disconnected from the first connector, the controller controls the integrated graphics card unit to drive the display screen to display.

12. The graphics card warning circuit of claim 11, wherein when the discrete graphics card is coupled to the first connector and the second connector, the discrete graphics card drives the display screen to display.

13. The graphics card warning circuit of claim 11, wherein:
the warning circuit comprises a switch unit and a warning unit;
the switch unit is configured to switch on in response to receiving the control signal and the coupling signal; and
the warning unit is configured to output the warning after the switch unit switches on.

14. The graphics card warning circuit of claim 13, wherein:
the switch unit comprises a first transistor, a first resistor, a second transistor, and a third transistor; a control terminal of the first transistor is coupled to the controller and configured to receive the control signal, and a second terminal of the first transistor is grounded; a first terminal of the first resistor is coupled to a first power source, and a second terminal of the first resistor is coupled to a first terminal of the first transistor;

a control terminal of the second transistor is coupled to the first terminal of the first resistor, a second terminal of the second transistor is coupled to the first power source; and a control terminal of the third transistor is coupled to the controller and configured to receive the coupling signal, a first terminal of the third transistor is grounded, and a second terminal of the third transistor is coupled to the first terminal of the second transistor.

15. The graphics card warning circuit of claim 14, wherein:

the warning unit comprises a second resistor and a light emitting diode (LED); a first terminal of the second resistor is coupled to the first power source; and an anode of the LED is coupled to a second terminal of the second resistor, and a cathode of the LED is coupled to the second terminal of the second transistor.

16. The graphics card warning circuit of claim 14, wherein the first transistor is an N-type metal oxide semiconductor field effect transistor (NMOSFET), and the second transistor and the third transistor are P-type metal oxide semiconductor field effect transistors (PMOSFETs).

17. The graphics card warning circuit of claim 10, wherein:

the controller comprises a first signal pin and a second signal pin; the second signal pin is configured to output the control signal;

the first signal pin is coupled to a first terminal of a third resistor and the first connector, a second terminal of the third resistor is coupled to a second power source; and when the discrete graphics card is coupled to the first connector, a signal level of the first signal pin is changed from a high level to a low level.

18. The graphics card warning circuit of claim 17, wherein the control signal is a high level signal and the coupling signal is a low level signal.

* * * * *